(12) United States Patent
Alstad et al.

(10) Patent No.: US 7,937,435 B2
(45) Date of Patent: *May 3, 2011

(54) IDENTIFYING, STORING, AND RETRIEVING CONTEXT DATA FOR A NETWORK MESSAGE

(75) Inventors: Kent Alstad, Surrey (CA); Richard Campbell, Coquitlam (CA); Cameron Gray, Newport Beach, CA (US); Lee Purvis, Langley (CA)

(73) Assignee: StrangeLoop Networks, Inc., Vancouver, BC (CA)

( * ) Notice: Subject to any disclaimer, the term of this patent is extended or adjusted under 35 U.S.C. 154(b) by 1343 days.

This patent is subject to a terminal disclaimer.

(21) Appl. No.: 11/359,637

(22) Filed: Feb. 21, 2006

(65) Prior Publication Data

US 2007/0204031 A1   Aug. 30, 2007

(51) Int. Cl.
    *G06F 13/00*   (2006.01)
(52) U.S. Cl. ...................................... 709/203
(58) Field of Classification Search ........... 709/246, 709/203; 718/105
    See application file for complete search history.

(56) References Cited

U.S. PATENT DOCUMENTS

| | | |
|---|---|---|
| 5,784,562 A | 7/1998 | Diener |
| 6,038,601 A | 3/2000 | Lambert et al. |
| 6,370,687 B1 | 4/2002 | Shimura |
| 6,385,641 B1 | 5/2002 | Jiang et al. |
| 6,604,143 B1 | 8/2003 | Nager et al. |
| 6,618,751 B1 | 9/2003 | Challenger et al. |
| 6,839,741 B1 | 1/2005 | Tsai |
| 7,139,780 B2 | 11/2006 | Lee et al. |
| 7,194,522 B1 | 3/2007 | Swildens et al. |
| 7,266,595 B1 | 9/2007 | Black et al. |
| 7,392,294 B2 | 6/2008 | Hellstrom |
| 7,469,280 B2 | 12/2008 | Simpson |
| 2003/0004937 A1 | 1/2003 | Salmenkaita et al. |
| 2003/0204769 A1 | 10/2003 | Coughlin |
| 2003/0225897 A1 | 12/2003 | Krawetz |
| 2004/0043758 A1 | 3/2004 | Sorvari et al. |
| 2004/0117438 A1 | 6/2004 | Considine et al. |
| 2004/0205165 A1 | 10/2004 | Melamed et al. |

(Continued)

FOREIGN PATENT DOCUMENTS

NZ   566291   2/2008

(Continued)

OTHER PUBLICATIONS

Jung, Gueyoung, et al. "Generating Adaptation Policies for Multi-Tier Applications in Consolidated Server Environments", in Proceedings of the 5th IEEE International Conference on Automonic Computing, Jun. 2-6, 2008, pp. 23-32.

(Continued)

*Primary Examiner* — Robert B Harrell
(74) *Attorney, Agent, or Firm* — Raubvogel Law Office

(57) ABSTRACT

A system and method for storing context data in a network device that is in the data path between a user computer and a server, thereby allowing for the secure and ongoing storage of user computer-specific context data without adding unnecessary complexity to existing web server methods, while at the same time supporting redundancy and facilitating effective load-balancing. By storing user computer-specific context data in the data path between the user computer and the server, the invention reduces the complexity of the web server, improves the handling of server failure, and increases the overall scalability of the system.

29 Claims, 10 Drawing Sheets

U.S. PATENT DOCUMENTS

| | | | |
|---|---|---|---|
| 2004/0268357 A1* | 12/2004 | Joy et al. ................ 718/105 |
| 2005/0033855 A1 | 2/2005 | Moradi et al. |
| 2005/0108335 A1 | 5/2005 | Naick et al. |
| 2005/0138033 A1 | 6/2005 | Katta |
| 2005/0210243 A1 | 9/2005 | Archard et al. |
| 2006/0015512 A1 | 1/2006 | Alon et al. |
| 2006/0095527 A1 | 5/2006 | Malik |
| 2006/0143290 A1 | 6/2006 | Dostert et al. |
| 2006/0212149 A1 | 9/2006 | Hicken et al. |
| 2006/0224723 A1 | 10/2006 | Chen |
| 2006/0225065 A1 | 10/2006 | Chandhok et al. |
| 2007/0005603 A1 | 1/2007 | Jain et al. |
| 2007/0174644 A1 | 7/2007 | Willig |
| 2007/0180035 A1 | 8/2007 | Liu et al. |
| 2007/0268865 A1 | 11/2007 | Garcia et al. |
| 2007/0291741 A1 | 12/2007 | Hwang |
| 2008/0008109 A1 | 1/2008 | Ollis |
| 2008/0016240 A1 | 1/2008 | Balandin |
| 2009/0132658 A1 | 5/2009 | Glickstein |

FOREIGN PATENT DOCUMENTS

| | | |
|---|---|---|
| WO | 0186494 | 11/2001 |

OTHER PUBLICATIONS

"Optimizing caching". Retrieved from: http://code.google.com/speed/page-speed/docs/caching.html.

"Seam Framework—HTTP client-server optimization strategies". Retrieved from: http://seamframework.org/Documentation/HTTPClientserverOptimizationStrategies.

Xue Liu et al., "On-line Response Time Optimization of Apache Web Server", Proceedings of the 11th international conference on Quality of service, 2003, Springer-Verlag, pp. 461-478.

* cited by examiner

IDENTIFYING, STORING, AND RETRIEVING CONTEXT DATA FOR A NETWORK MESSAGE

BACKGROUND OF THE INVENTION

1. Field of the Invention

The invention generally relates to servers storing user-specific state information and, specifically, to network devices such as routers hosting user-specific state information for the purpose of providing personalized content on the World Wide Web.

2. Description of Background Art

On the World Wide Web (i.e. the "web"), it is frequently desirable for websites to store information relating to a specific user and/or user computer. For many applications it is necessary to associate a user computer with context data relating to previous interactions with that same user computer. For example, a user may indicate certain preferences regarding the display of a particular website, and it may be desirable to associate those preferences with the user computer for future visits. However, the standard protocol for transferring web pages, the HyperText Transfer Protocol (HTTP), provides only a very limited capability to store user computer-specific context data across visits.

Known methods for storing user computer-specific context data built into HTTP usually involve storing a small segment of data, called a "magic cookie" or simply "cookie," on the user computer. Cookies form the building blocks for most user computer-specific context data storage on the web, but they have several serious limitations. Cookies are limited in size, finite in quantity, and can be arbitrarily modified or deleted by the user. They also pose privacy and security concerns, which limit their suitability for storage of many kinds of context data that would be desirable to store. For example, it may be desirable for a website to automatically store a user's personal information for the purpose of facilitating future visits from the same user, but storing the user's personal information in a cookie makes the information potentially vulnerable to disclosure or malicious modification by other programs or websites, yielding an undesirable result.

Other techniques for storing data on the user computer include ASP.NET View State, hidden form fields, and URL query strings. However, all of these techniques are limited in the amount of data they can store, and many of them threaten the security of the user computer when used to store critical data.

To address these concerns, many web servers use cookies (or other techniques) to store index data in the user computer. This index data is then used to retrieve the user computer-specific context data from a database of context data stored at the web server. The user computer-specific context data can be stored securely at the web server while still being uniquely associated with various user computers through use of cookies.

While the technique of using index data contained in cookies to retrieve context data stored at the web server is an improvement over storing context data in cookies directly, it introduces several other problems when put into practice.

Web servers are highly active systems with many processes running in parallel. It is quite common for web servers to crash, freeze, restart, or slow due to high volume of traffic. These events can make the website and any stored context data unavailable for a period of time, and, in some cases, result in the loss of context data entirely.

To alleviate the effect of server failure, it is common for websites to be hosted on multiple web servers. Many websites receive such a high volume of page requests that without hosting them on multiple web servers the response time to page requests would be intolerable. Having multiple web servers reduces the likelihood that the website will become unavailable due to a server failure and increases the overall capability of the system to handle a high volume of page requests. Various techniques for load balancing have been implemented for evenly assigning incoming web page requests to one of an array of web servers. These techniques are designed to smooth the response to page requests despite server delays or failures.

However, load balancing does not address the problem of potential context data loss due to server failure. If context data is stored on a web server that fails, load balancing techniques may be able to continue web service without interruption, but the context data stored on that web server may be lost. Load balancing alone does not protect context data from server loss.

Furthermore, storing context data on web servers hinders load balancing. If the user computer-specific context data is stored on a certain web server, it is necessary that return visits by the user computer be handled by the same web server so as to facilitate retrieval of the context data. Thus the user computer remains associated with a particular web server, even though load conditions may have changed, causing another server to have greater availability of capacity. This static association between a user computer and a web server reduces the effectiveness of load balancing. Load balancing techniques have difficulty assigning page requests to web servers evenly when a large portion of incoming page requests must necessarily be assigned to a specific web server.

Additionally, storing context data on a web server poses challenges for maintaining or upgrading the web server, as context data can persist for long periods of time, and it is not generally known when the return of a certain user computer will necessitate access to certain context data.

Context data can be stored in a context server external to the web server. However, storing context data external to the web server introduces several extra steps. In order to process a request, the web server must receive the request, determine the need for context, request the context data from the external context server, wait for a response, process that response, write the updated context data back to the external state server, and finally return the web request. These extra steps introduce delay, complexity, and the potential for failure.

What is needed is a method for storing and retrieving user computer-specific context data securely and for an indefinite period of time, in a manner that supports redundancy and is compatible with load-balancing techniques, and without adding unnecessary complexity or steps to the method of the web server.

SUMMARY OF THE INVENTION

The invention is a system and method for storing context data in a network device located in the data path between the user computer and the web server, thereby allowing for the secure and ongoing storage of user computer-specific context data without adding unnecessary complexity or steps to existing web server methods, while at the same time supporting redundancy and facilitating effective load-balancing. By storing user computer-specific context data in the data path between the user computer and the web server, the invention reduces the complexity of the web server and improves handling of server failure. Furthermore, the total amount of network traffic is reduced, as the web server does not have to make an additional request, and subsequent update of context data, to an external context data server.

In one embodiment of the present invention, the context data server is located in the data path between the user computer and the web server; thus, the system of the present invention has the opportunity to intercept messages from the user computer to the web server and from the web server to the user computer. The context data server stores context data in a context database by reading context data from messages passing between the web server and the user computer. The context data server may also insert or use index data in messages passing between the web server and the user computer to facilitate the retrieval of context data. The context data server may also remove context data or index data from messages passing between the web server and the user computer. The context data server may also add context data from the context database to messages passing between the user computer and the web server.

According to one embodiment of the present invention, the data necessary for the storage, retrieval, and management of a context database are piggy-backed on standard network messages passing between the web server and the user computer and between the user computer and the web server.

According to one embodiment of the present invention, the user-specific context data is stored in a router in the data path between the user and the web server. The router performs the context data storage and retrieval functions herein described in addition to the functions commonly performed by a router.

DETAILED DESCRIPTION OF THE EMBODIMENTS

Figure 1A:
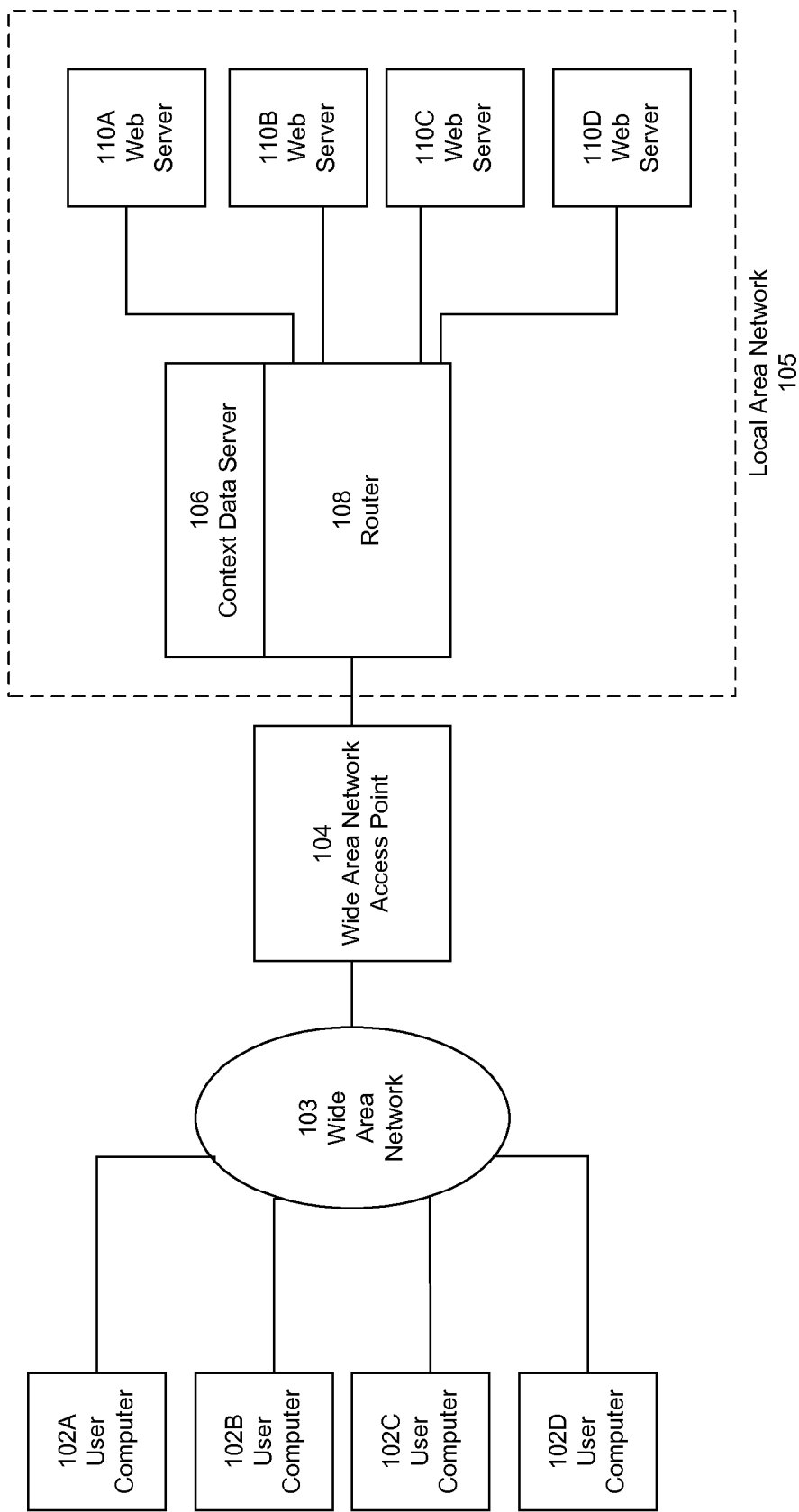
FIG. 1(a) is a block diagram illustrating a combined context data server and router, connected in the data path of a typical wide area network connection, according to one embodiment of the present invention.

Embodiments of the present invention are now described with reference to the figures where like reference numbers indicate identical or functionally similar elements.

According to one embodiment of the present invention, the context data server is located in the data path between the user computer and the web server in the sense that the system of the present invention has the opportunity to intercept messages from the user computer to the web server and from the web server to the user computer. The context data server stores and retrieves context data in a context database by reading context data from messages passing between the web server and the user computer. The context data server may also insert or use index data in messages passing between the web server and the user computer to facilitate the retrieval of context data. The context data server may also remove context data or index data from messages passing between the web server and the user computer. By performing at least some of these functions in the data path between the web server and the user computer, the context data server reduces the need for additional context data request and update messages.

For the purposes of illustration, the term 'user computer' will be employed throughout this disclosure to refer any electronic device capable of sending and receiving messages on a network. A non-exhaustive list of examples of user computers includes personal computers, enterprise computing systems, cellphones, handheld devices, personal digital assistants (PDAs), gaming consoles, and portable entertainment systems. One skilled in the art will recognize that any number of devices may be implemented to fulfill the role of the 'user computer' described herein without departing from the scope of the present invention.

The context data server may use methods to associate context data with a specific user, or it may use methods to associate context data with a specific user computer. Some computer systems support multiple users on the same computer, and some users may use multiple computers. The invention is equally applicable to both user-specific context data and user computer-specific context data. For the purposes of illustration herein all such context data will be referred to as user computer-specific context data without limiting the scope of the invention.

The invention is concerned with the storage and retrieval of context data. Context data can be any data that it is desired to have available when a user or user computer makes a future data request. For example, it may be desirable for a web server to store shopping cart information relating to a specific user, for a file server to store a history of file accesses relating to a specific user computer, or for a game server to store gameplay information relating to a specific user. The invention assists a server in responding to data requests by storing and retrieving data pertaining to the user or user computer originating those requests.

Context data may come in many forms, and the invention is applicable to all such forms. One skilled in the art will recognize that other forms of context data having other uses may be stored and/or processed according to the techniques described herein without departing from the essential characteristics of the present invention.

For the purposes of illustration, the invention is frequently described herein as being useful in conjunction with HTTP requests, HTTP responses, and web servers. However, it will be apparent to one skilled in the art that the invention is useful in conjunction with any kind of data request, any kind of data response, any kind. of data server, and any form of index data.

The context data server is described as a server for the purposes of illustrating one embodiment of the present invention. According to another embodiment of the present invention, the function of the context data server can be performed by any device capable of storing and retrieving a segment of data.

FIG. 1(*a*) is a block diagram illustrating a combined context data server and router, connected in the data path of a typical wide area network connection, according to one embodiment of the present invention. Each user computer 102 is a device capable of making requests for data over a wide area network. For example, user computer 102 can be a personal computer executing a standard web browser program, or it can be a portable device requesting data using another protocol. In one embodiment, there are a plurality of user computers 102A, 102B, 102C, and 102D connected to a wide area network 103, and each user computer 102 may have some unique context data associated with the past actions of said user computer 102.

Each user computer 102 is capable of storing index data at the request of a server connected to the wide area network 103. Once stored, this index data is sent to the server as a component of future data requests. The index data may be stored on the user computer 102 and included in future data requests using a variety of methods. For example, according to one embodiment of the present invention, HTTP cookies may be used to store index data on the user computer 102. According to another embodiment of the present invention, HTTP-post hidden form fields, ASP.NET View State fields, and URL query strings may be used to store index data on the user computer 102.

One skilled in the art will recognize that the examples of methods for storing index data on the user computer 102 are not intended to be exhaustive and that a wide variety of technologies are applicable to the present invention.

Each user computer 102 may be connected to the wide area network 103 through at least one of several connection devices, including routers, modems, and wireless access points. These connection devices are not shown as such connection devices and methods are well known in the art.

The wide area network 103 may be any network capable of connecting a user computer 102 with a web server 110. In one embodiment, the wide area network 103 is the Internet. In another embodiment the wide area network 103 is a private network. The wide area network 103 is capable of conveying messages bi-directionally between the user computer 102 and the wide area network access point 104.

The wide area network access point 104 is the point of connection between the wide area network 103 and the local area network 105. The wide area network access point 104 may be a digital subscriber line modem, an analog modem, a cable modem, a network card, a broadband wireless hub, or any other device for transferring data between the wide area network 103 and the local area network 105.

For clarity, the context data server 106, the router 108, and the web server 110 are depicted as components of a local area network 105. However, in one embodiment, the router 108 can in fact be a great distance from the web server 110, and can further be considered as part of a separate network. The presentation of the context data server 106, the router 108, and the web server 110 as components of the local area network 105 is intended to clarify the description of the invention for the purposes of enablement and is not intended to limit the forms the invention can take.

In one embodiment, the local area network interfaces with a single wide area network access point 104 and includes at least one web server 110. Connected between the wide area network access point 104 and the web server 110 is at least one router 108. The router or routers 108 are configured to efficiently relay data among the web servers 110 (if multiple web servers 110 are implemented) and between a web server 110 and the wide area network access point 104. Other network devices may also be connected to the local area network 105.

In FIG. 1(*a*), a single router 108 is depicted, with a context data server 106 adjoined. The router 108 is capable of receiving an incoming message and repeating it on at least one of a plurality of network ports. The router 108 may also modify the incoming message before repeating it, such as in the well-known method of network address translation (NAT).

The context data server 106 may be adjoined to the router 108 differently depending on the embodiment of the invention. In one embodiment, the context data server operates using the same physical hardware (such as processor, network ports, electronic storage) as the router 108. In another embodiment, the context data server 106 shares some physical hardware (such as enclosure, power supply, and network ports) but does not share certain other physical hardware (such as processor and electronic storage). In another embodiment, the context data server 106 does not share any physical hardware with the router 108, but the context data server 106 is connected in series to at least one router 108.

In an implementation with multiple routers 108, the context data server 106 can be joined to any one of the routers 108 so long as the placement sets the context data server 106 in the data path between a web server 110 and the wide area network access point 104. According to one embodiment of the present invention, multiple context data servers are implemented, and are connected either in series or parallel in the data path between a web server and a wide area network access point. In a preferred embodiment, when multiple routers 108 are implemented hierarchically, the context data server 106 is adjoined the router 108 with the highest position in the hierarchy of those routers 108 connected to web servers 110.

The context data server 106 is connected in such a way so that it may intercept messages originating from each user computer 102 and destined for the web server 110 and messages originating from the web server 110 and destined for each user computer 102. The method of the context data server 106 will be described in greater detail in connection with FIGS. 2-5.

The web server 110 is connected to the router 108. The web server 110 is a device capable of receiving a request for data and transmitting data in response. For example, the web server 110 may be an HTTP server capable of receiving page requests and returning web pages according to the HTTP. As another example, the web sever 110 may be any server capable of sending datagrams according to a protocol such as the User Datagram Protocol (UDP), or the Transmission Control Protocol (TCP). The web server 110 may consist of multiple devices, which in conjunction have the capabilities of a web server 110. Although the example of a web servers has been chosen for the purposes illustration, one skilled in the art will recognize that the invention is applicable to embodiments employing any device capable of receiving and transmitting data.

The web server 110 may be implemented using at least one of the many devices commonly available for responding to data requests. For example, the web server 110 may be implemented using a standard Personal Computer (PC) and software such as Apache HTTP Server. The web server 110 could also be implemented, for example, using Microsoft® Internet Information Server, ASP.NET 2.0, ASP.NET 1.1, Classic ASP, JSP, IBM® Websphere, or Linux Apache PHP. The web server could be implemented as an online gaming server. One skilled in the art will recognize that these examples are not intended to be exhaustive and that other implementations of the web server are also applicable to the present invention.

Figure 6:
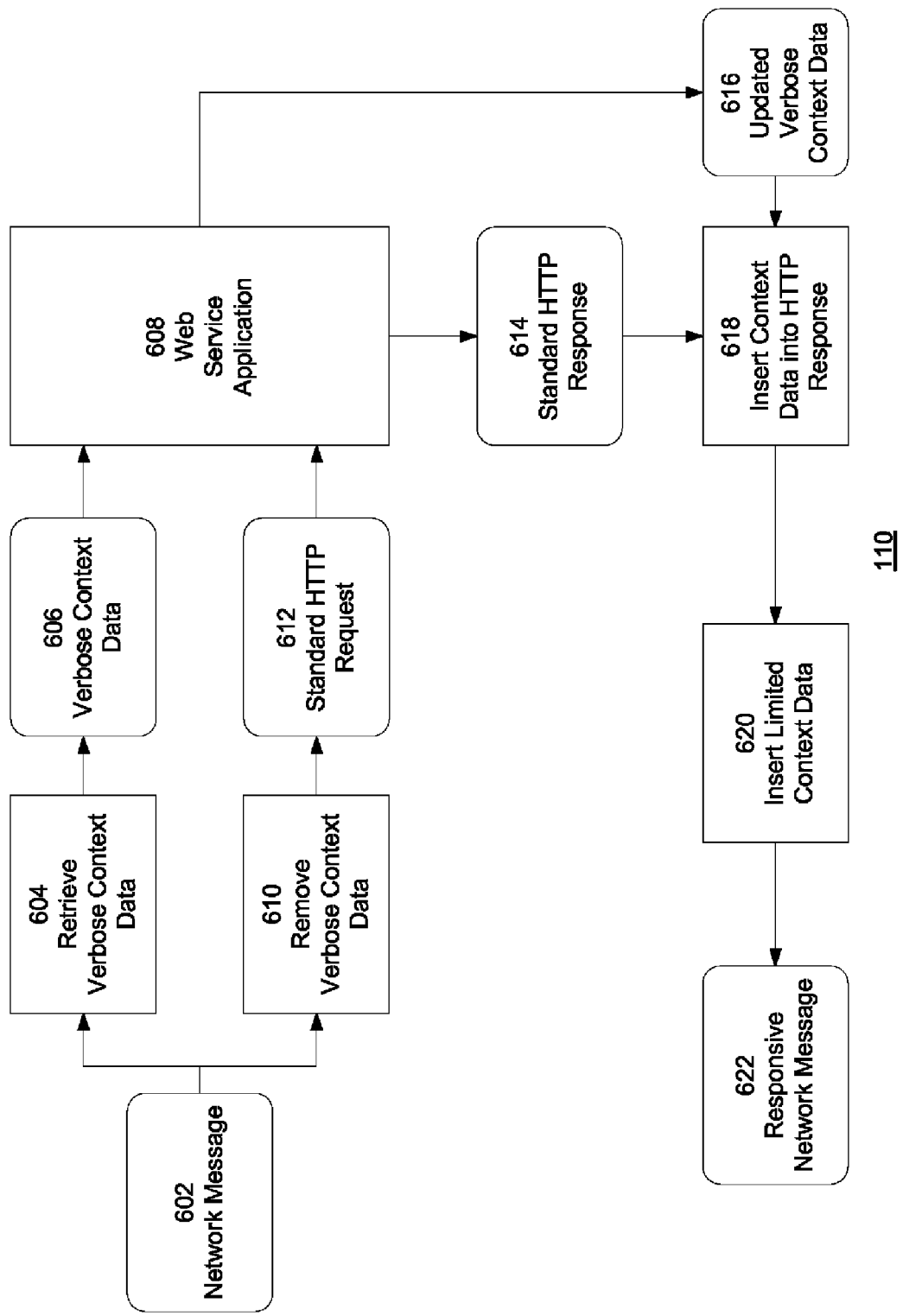
FIG. 6 is a flow diagram illustrating a method for responding to a page request containing context data, according to one embodiment of the present invention.

The web server 110 may also include methods and/or systems for interfacing with the context data server 106. The method used by the web server 110, according to one embodiment of the present invention, is illustrated in FIG. 6.

Figure 1B:
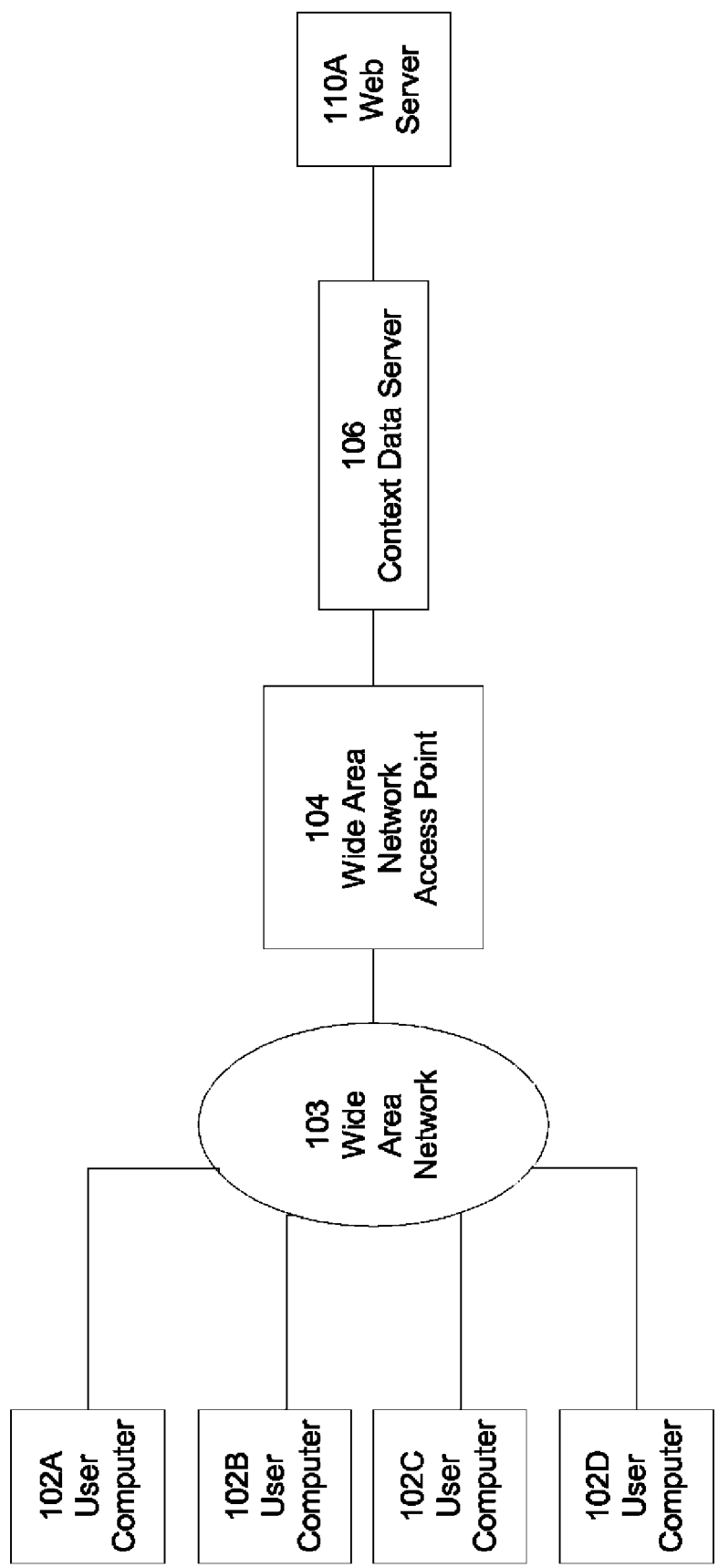
FIG. 1(b) is a block diagram illustrating a context data server connected in the data path of a typical wide area network connection, according to one embodiment of the present invention.

FIG. 1(b) is a block diagram illustrating a context data server connected in the data path of a typical wide area network connection, according to one embodiment of the present invention. The context data server 106 is connected to the wide area network access point 104 and the web server 110. In one embodiment, the context data server 106 is not adjoined to any router 108.

The user computer 102, wide area network 103, wide area network access point 104, and web server 110 are similar to those herein described in reference to FIG. 1(a). The context data server 106 is connected in such a way so that it may intercept messages originating from each user computer 102 and destined for the web server 110 and messages originating from the web server 110 and destined for each user computer 102. The method of the context data server 106 will be described in greater detail in FIGS. 2-5. According to one embodiment of the present invention, the context data server 106 operates without a router and in conjunction with a single web server 110.

Figure 1C:
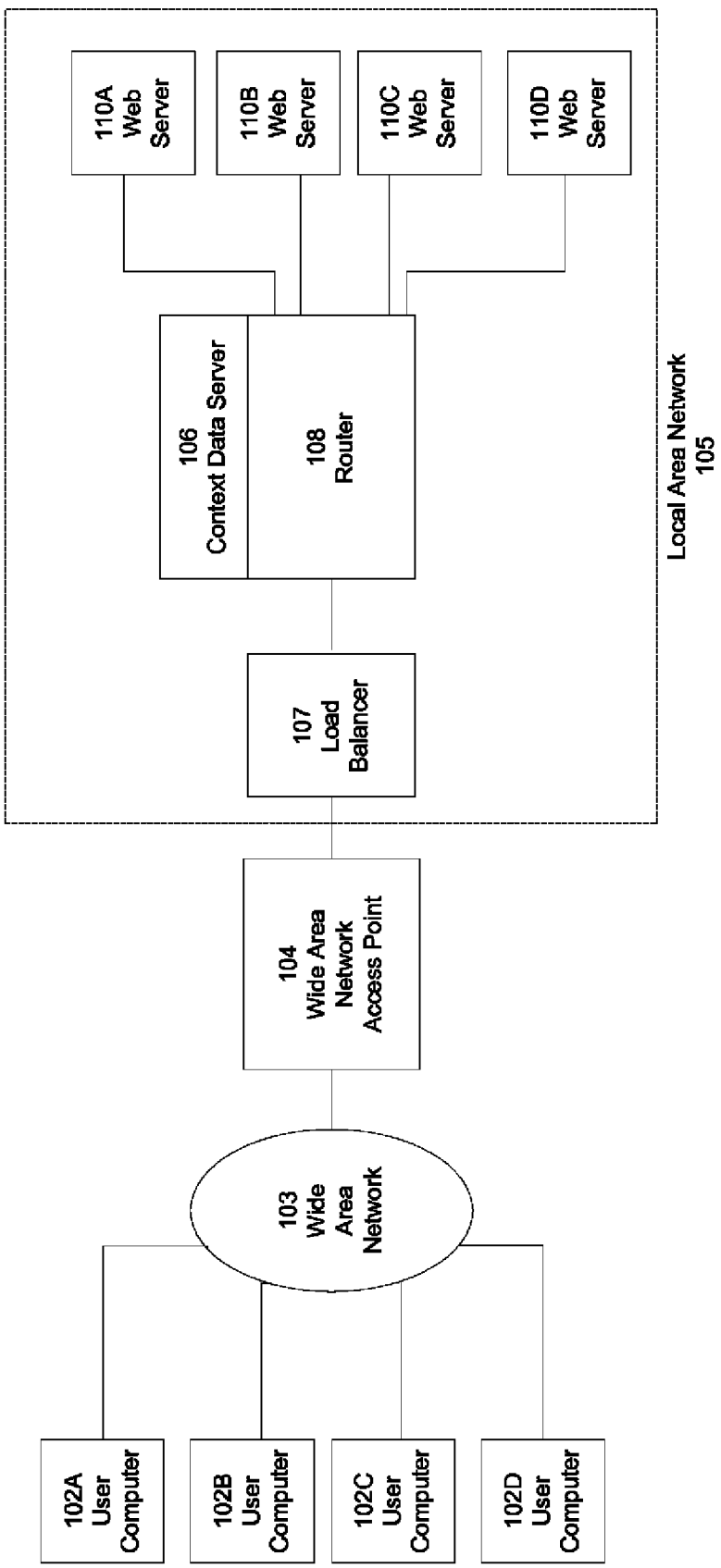
FIG. 1(c) is a block diagram illustrating a combined context data server and router, connected in the data path of a typical wide area network connection, according to one embodiment of the present invention.

FIG. 1(c) is a block diagram illustrating a combined context data server and router, connected in the data path of a typical wide area network connection, according to one embodiment of the present invention. The user computer 102, wide area network 103, wide area network access point 104, context data server 106, router 108, and web server 110 are similar to those herein described in reference to FIG. 1(a).

According to one embodiment of the present invention, the load balancer 107 is connected to the wide area network access point 104 and to the router 108. The load balancer 107 is capable of receiving an incoming page request and redirecting it to a web server 110 on the basis of the current availability of the various web servers 110. For example, if web server 110A is overloaded due to a high volume of page requests, but web server 110B has available request-handling capability, the load balancer 107 directs incoming page requests to web server 110B. The load balancer 107 may be implemented using any one of many commonly available load balancing methods. Such methods can include random allocation, round-robin allocation, weighted round-robin, least connections, and IP hash among others.

In FIG. 1(c), a single router 108 is depicted, with a context data server 106 adjoined. As described herein with reference to FIG. 1(a), the context data server 106 may be adjoined to the router 108 differently depending on the embodiment of the invention. According to one embodiment of the present invention, the context data server 106 does not share any physical hardware with the router 108. The load balancer 107, router 108, and context data server 106 are connected in series, and may be connected in any order, according to one embodiment of the present invention. For example, the load balancer 107 may be connected between the wide area network access point 104 and the context data server 106, or the load balancer 107 may be connected between the context data server 106 and the web server 110. Other methods for connecting the wide area network access point 104, load balancer 107, router 108, and the context data server 106 will be apparent to one of skill in the art without departing from the scope of the present invention. According to one embodiment of the present invention, the context data server 106 may operate in conjunction with a load balancing device, such as the load balancer 107. According to another embodiment of the present invention, the load balancer 107 is adjoined to the context data server 106. The load balancer 107 and the context data server 106 may share all, some, or no physical hardware, according to various embodiments of the present invention.

Figure 2:
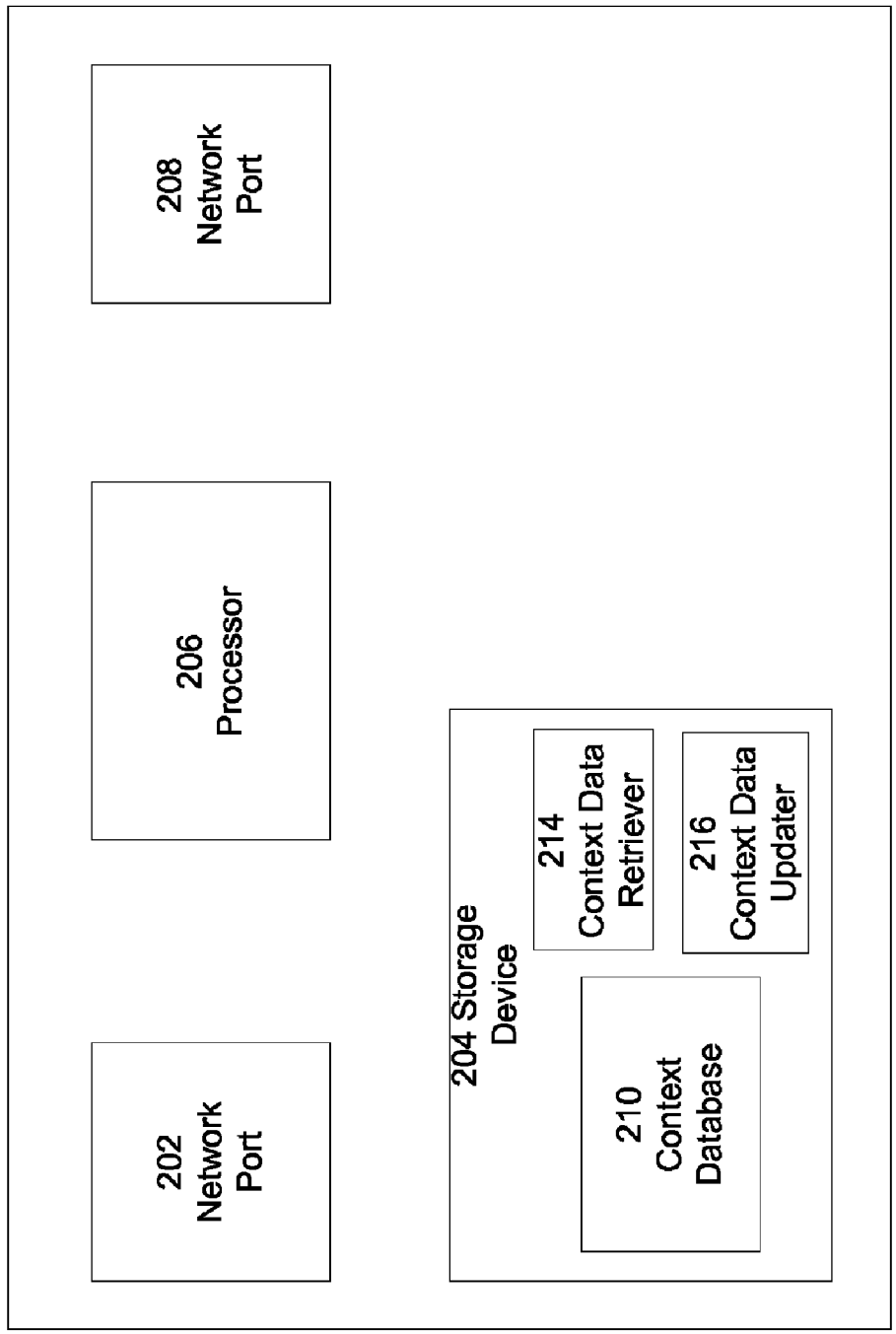
FIG. 2 is a block diagram illustrating the hardware configuration of a context data server, according to one embodiment of the present invention.

FIG. 2 is a block diagram illustrating the hardware configuration of one embodiment of the context data server 106, according to one embodiment of the present invention. As explained previously, some or all of the hardware of the context data server 106 may be shared with the router 108. FIG. 2 illustrates the hardware of the context data server 106 as if said hardware were dedicated, but in fact, some or all of this hardware can be shared with other devices.

The network port 202 is a standard device capable of sending and receiving messages over a network. The network port 208 is also a standard device capable of sending and receiving messages over a network. As a pair, the network port 202 and the network port 208 allow the context data server 106 to be in the data path between the wide area network access point 104 and the web server 110. Network messages not requiring the retrieval or storage of context data can be passed from one network device to the other without change, so that the normal operation of the network is not affected. On the other hand, network messages requiring either the retrieval or storage of context data can be read and/or modified as necessary before continuing on the data path to their destination.

The processor 206 is a standard processor capable of executing instructions. Any standard microcomputer processor could be used to implement the processor 206, for example, the x86 family of 32- and 64-bit processors.

The storage device 204 includes at least one of the many common components available for electronic storage. The storage device 204 stores incoming and outbound network messages and instructions for the processor 206. The storage device 204 also includes the context database 210. The context database 210 may be a standard database capable of storing and retrieving data on the basis of some index data.

The storage device 204 also includes a context data retriever 214 and a context data updater 216. The method used by the context data retriever 214, according to one embodiment of the present invention, is illustrated in greater detail in connection with FIG. 4. The method used by the context data updater 216, according to one embodiment of the present invention, is illustrated in greater detail in connection with FIG. 5.

FIG. 3 is an event trace illustrating the storage and retrieval of context data at a context data server in a typical exchange between a user computer 102 and a web server 110, according to one embodiment of the present invention. For the purpose of illustration, FIG. 3 depicts an example in which the web server 110 is a web server and the data is requested by the user according to the HTTP. However, as explained previously, in various embodiments the invention is capable of storing and retrieving context data in conjunction with various types of servers, various types of data requests, and in conjunction with data requests according to various protocols such as Hypertext Transfer Protocol Secure (HTTPS).

FIG. 3 depicts the reception and transmission of messages at the context data server 106. For the purposes of simplicity, these receptions and transmissions are illustrated without the intervening wide area network 103, wide area network point 104, and router or routers 108. Various configurations of network routers and links are implicit in the arrows depicting message reception and transmission among the user computer 102, context data server 106, and web server 110.

Figure 3A:
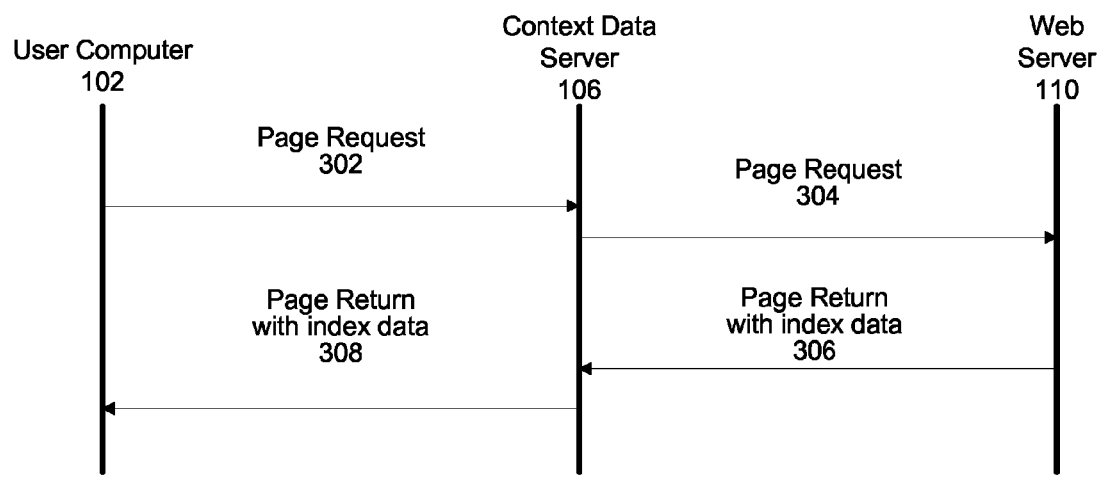
FIG. 3 illustrates the storage and retrieval of context data at a context data server in a typical exchange with a web server, according to several embodiment of the present invention.

FIG. 3(a) depicts an HTTP exchange between the user computer 102 and the web server 110 not requiring the retrieval or storage of context data. The user computer 102 sends a page request 302 to the context data server 106. Because the page request 302 does not contain index data, it is not necessary to retrieve any context data, so the context data server 106 forwards the message on to the web server 110 as the page request 304.

The web server 110 receives the page request 304 and retrieves the appropriate web page. The method for responding to a page request in the web server 110 is described in greater detail herein with reference to FIG. 6. The web server 110 generates a page return, includes in the page return some index data, and transmits the resulting page return with index data 306.

The context data server 106 receives the page return with index data 306. Because the page return with index data 306 does not contain context data, it is not necessary to store any context data, so the context data server 106 forwards the message on to the user computer 102 as the page return with index data 308.

The user computer 102 receives the page return with index data 308. The user computer 102 displays or saves the page and stores the index data locally. Various methods for storing index data locally are available; a non-exhaustive set of examples has been given herein with reference to FIG. 1.

Figure 3B:
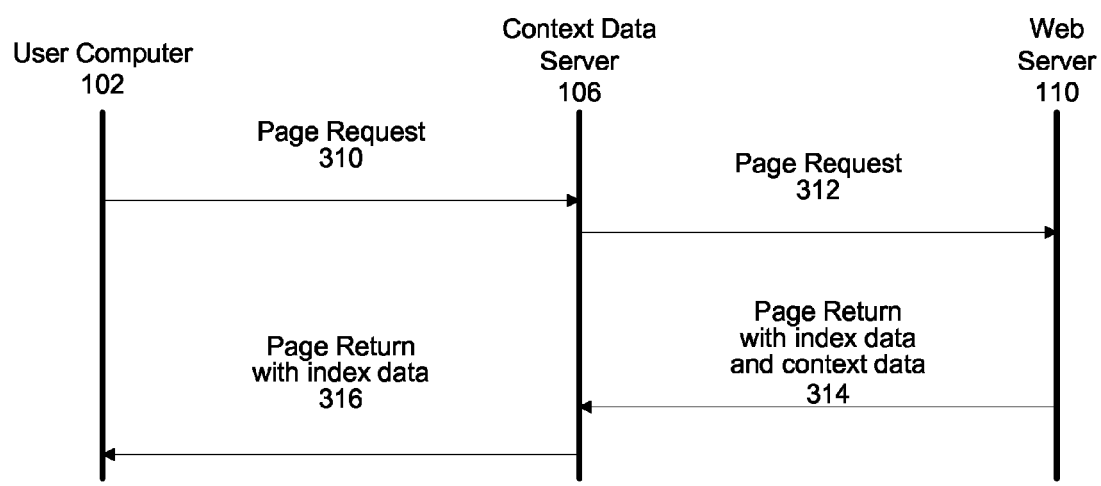

FIG. 3(b) depicts an HTTP exchange between the user computer 102 and the web server 110 for which it is desired to store context data. The user computer 102 sends a page request 310 to the context data server 106. Because the page request 310 does not contain index data, it is not necessary to retrieve any context data, so the context data server 106 forwards the message on to the web server 110 as the page request 312.

The web server 110 receives the page request 312 and retrieves the appropriate web page. The web server 110 generates a page return. In this case, however, the processing of the page request 312 generates some context data requiring storage. The web server 110 generates a page return, includes in the page return index data, inserts the context data, and transmits the resulting page return with index data and context data 314.

The context data server 106 receives the page return with index data and context data 314. In this example the page return with index data and context data 314 does contain context data, so the context data server 106 stores the context data in the context database. The method for storing context data in the context data server 106 is described in greater detail herein with reference to FIG. 5. According to one embodiment of the present invention, the context data server 106 removes the context data from the message and forwards the resulting page return with index data 316 to the user computer 102.

The user computer 102 receives the page return with index data 316. The user computer 102 displays or saves the page and stores the index data locally. Various methods for storing index data locally are available; a non-exhaustive set of examples has been given herein with reference to FIG. 1.

Figure 3C:
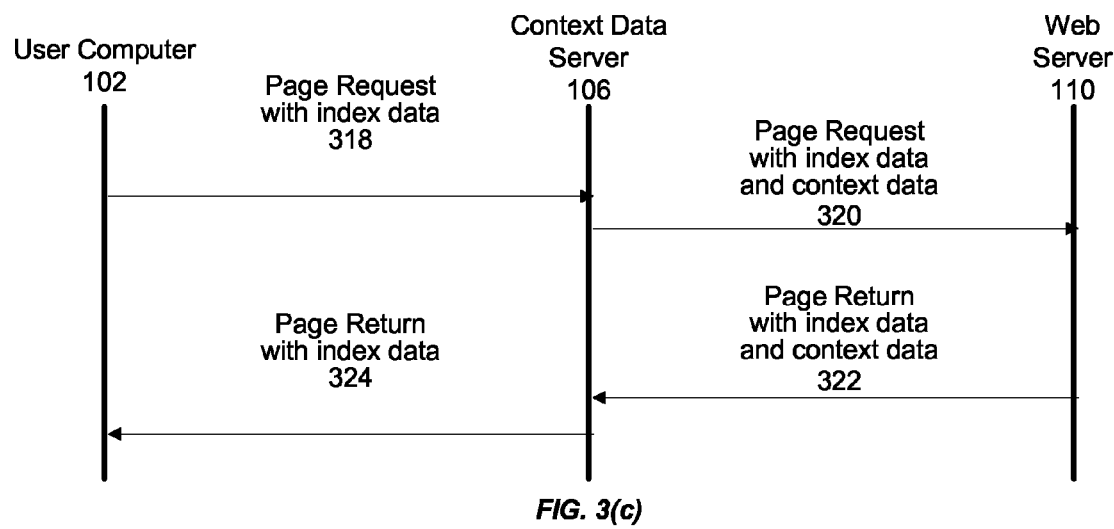

FIG. 3(c) depicts an HTTP exchange between the user computer 102 and the web server 110 requiring the retrieval and updating of context data. The user computer 102 sends a page request with index data 318 to the context data server 106. The page request with index data 318 contains index data, so the context data server 106 searches the context database for associated context data. The method for retrieving context data in the context data server 106 is described in greater detail herein with reference to FIG. 4.

If the context data server 106 finds context data associated with the index data, the context data server 106 inserts that context data into the message, and forwards the resulting page request with index data and context data 320 to the web server 110.

The web server 110 receives the page request with index data and context data 320 and retrieves the appropriate web page. The web server 110 may customize or retrieve differently the web page depending on the context data.

The web server 110 generates a page return. In this case, however, the processing of the page request with index data and context data 320 generates some new or updated context data requiring storage. The web server 110 generates a page return, includes in the page return either the same or different index data, inserts the new or updated context data, and transmits the resulting page return with index data and context data 322.

The context data server 106 receives the page return with index data and context data 322. In the case that the page return with index data and context data 322 contains new or updated context data, the context data server 106 stores or updates the context data in the context database appropriately. According to one embodiment of the present invention, the context data server 106 removes the context data from the message and forwards the resulting page return with index data 324 to the user computer 102.

The user computer 102 receives the page return with index data 324. The user computer 102 displays or saves the page as indicated by the user and stores the index data in a local cache. Various methods for storing index data locally are available; a non-exhaustive set of examples has been given herein with reference to FIG. 1.

As shown, by installing the context data server 106 in the data path between the user computer 102 and the web server 110, context data is securely stored and retrieved without additional complication or steps on the part of either the user computer 102 or the web server 110.

Figure 3D:
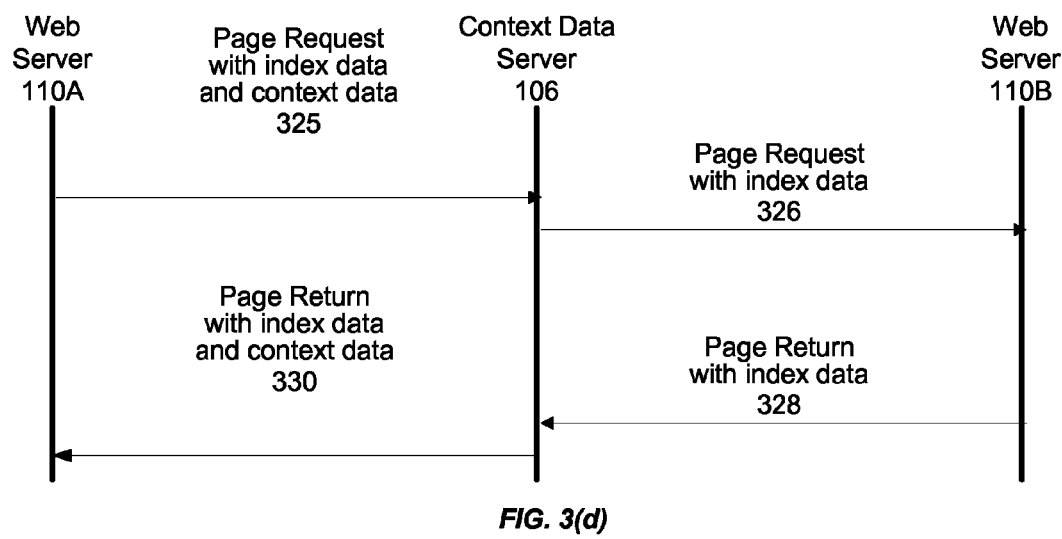

FIG. 3(d) depicts an HTTP exchange between the web server 110A and the web server 110B requiring the retrieval and updating of context data. Inserting a context data server in the data path between a first web server and a second web server may be useful, for example, in a confidential transaction in which the first web server processes a confidential portion of the transaction and the second web server processes a non-confidential portion of the transaction. The web server 110A sends a page request with index data and context data 325 to the context data server 106. The web server 110A may send a page request with index data and context data 325, for example, in response to a page request from a user computer not shown. In the case that the page return with index data and context data 325 contains new or updated context data, the context data server 106 stores or updates the context data in the context database appropriately. According to one embodiment of the present invention, the context data server 106 removes the context data from the message and forwards the resulting page request with index data 326 to the web server 110B.

The web server 110B receives the page request with index data 326 and retrieves the appropriate web page. The web server 110B generates a page return, includes in the page return either the same or different index data and transmits the resulting page return with index data 328.

The page return with index data 328 contains index data, so the context data server 106 searches the context database for associated context data. A method for retrieving context data in the context data server 106 is described in greater detail herein with reference to FIG. 4.

If the context data server 106 finds context data associated with the index data, the context data server 106 inserts that context data into the message, and forwards the resulting page return with index data and context data 330 to the web server 110A.

The web server 110A receives the page return with index data and context data 330 and handles the page return appropriately. The web server 110A may customize or handle differently the web page depending on the context data. The web server 110A may forward the page return, either with or without context data, on to a user computer not shown.

Figure 4:
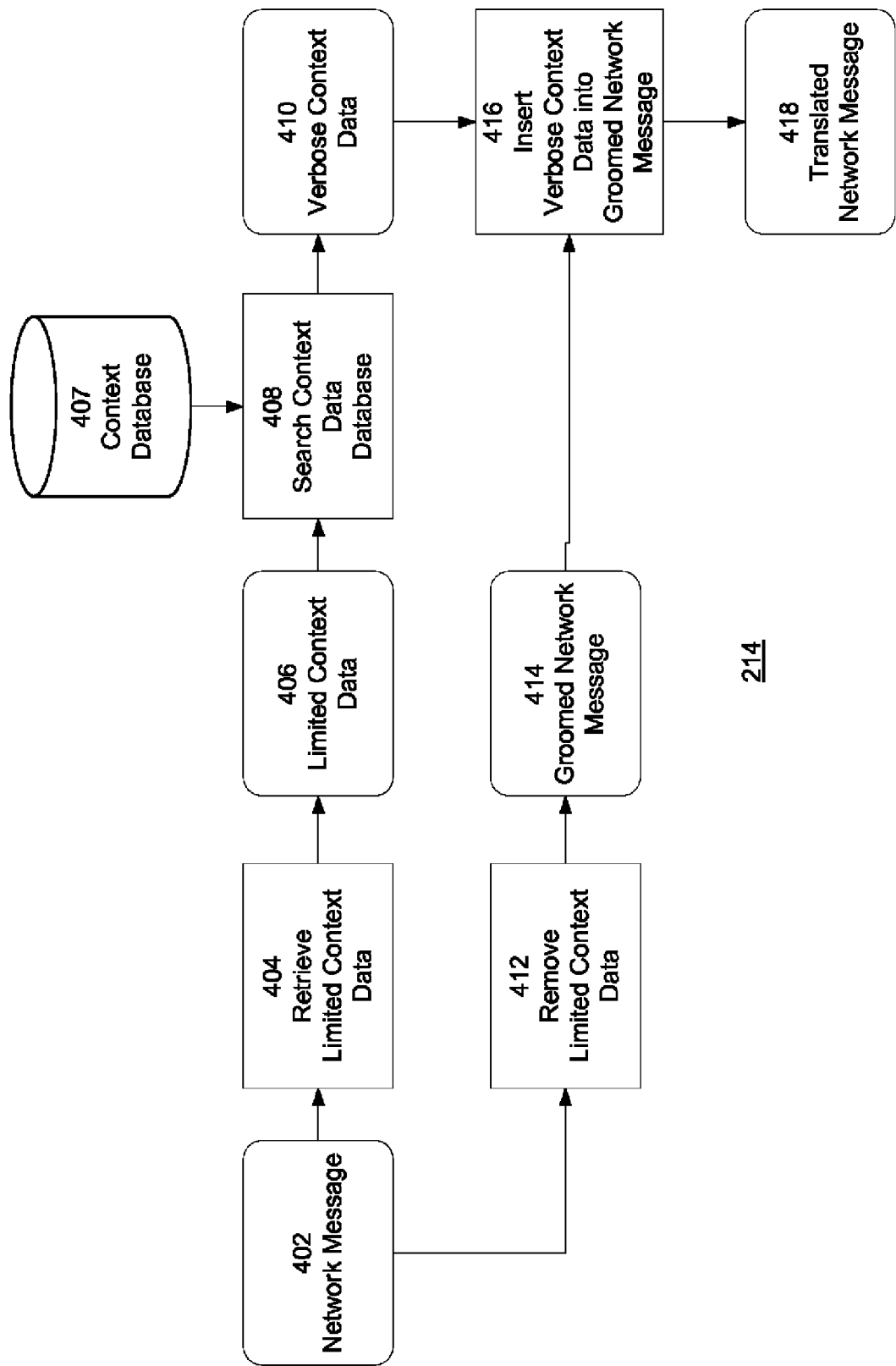
FIG. 4 is a flow diagram illustrating a method for retrieving context data in a context data server, according to one embodiment of the present invention.

FIG. 4 illustrates a method for retrieving context data in a context data server, according to one embodiment of the present invention. In one embodiment, the method is performed by the context data retriever 214. A network message 402 has been received by the context data server 106. In the example illustrated, the network message 402 includes some limited context data 406 that has been previously stored in the context database 407 as associated with some verbose context data 410. According to one embodiment of the present invention, the limited context data 406 is analogous to the index data described herein with reference to FIG. 3. The limited context data 406 may be any data from which it is possible to retrieve verbose context data. The limited context data 406 may be contained in the network message 402 in any number of manners. For example the limited context data 406 could be contained in a cookie field, a hidden form field, a View State field, or somewhere else in the network message 402. Limited context data 406 could be contained in the header of the network message 402, for example, in the case in which the user computer 102 transmits the limited context data 406 in the form of a URL query string.

The context data retriever 214 retrieves 404 the limited context data 406 from the network message 402. The context data retriever 214 searches 408 the context database 407 for verbose context data 410 retrievable by the limited context data 406.

According to one embodiment of the present invention, the network message 402 can be an HTTP page request and the limited context data 406 can be stored in a cookie. For example, the context data retriever 214 would retrieve 404 the limited context data 406 by reading the cookie in the network message 402, where the network message 402 is an HTTP page request containing a cookie.

The context data retriever 214 optionally removes 412 the limited context data from the network message 402 to produce a groomed network message 414. In some embodiments it is not necessary to remove 412 the limited context data, while in other embodiments this procedure is desirable. If this optional procedure is not implemented, the groomed network message 414 is equivalent to the network message 402.

The context data retriever 214 inserts 416 the verbose context data 410 into the groomed network message 414 to produce a translated network message 418. The translated network message 418 is ready to be sent to the web server 110, as illustrated in FIG. 3. The translated network message 418 is of a form such that the request contained therein may be processed by the web server 110 without further need for external context data retrieval.

Figure 5A:
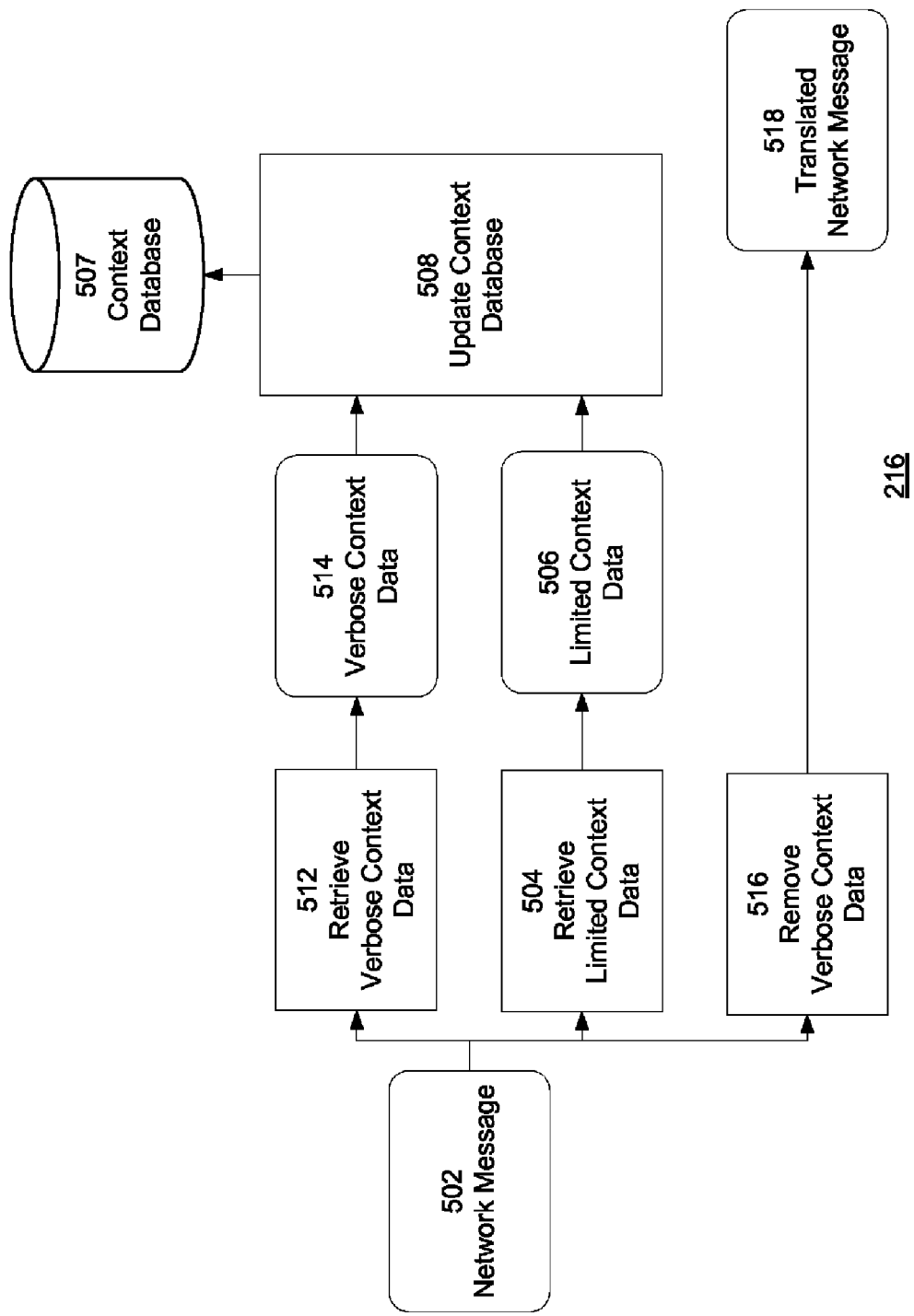
FIG. 5a is a flow diagram illustrating a method for storing context data in a context data server, according to one embodiment of the present invention.

FIG. 5a illustrates a method for storing context data in a context data server, according to one embodiment of the present invention. In one embodiment, the method is performed by the context data updater 216. A network message 502 has been received by the context data server 106. In this example, the network message 502 comprises some verbose context data 514.

Additionally, according to one embodiment of the present invention, the network message 502 includes some limited context data. The context data updater 216 retrieves 504 limited context data 506 from the network message 502. According to one embodiment of the present invention, the limited context data 506 may be analogous to the index data described herein with reference to FIG. 3. The limited context data 506 may be any data with which it is possible to associate verbose context data in the context database.

The limited context data 506 may be contained in the network message 502 in any number of manners. For example the limited context data 406 could be contained in a cookie field, a hidden form field, in the header of the network message, or somewhere else in the network message 502.

According to one embodiment of the present invention, the network message 502 can be an HTTP page response and the limited context data 506 can be contained in a cookie. For example, the context data updater 216 would retrieve 504 the limited context data 506 by reading the cookie from the network message 502, where the network message 502 is an HTTP page response containing a cookie.

The context data updater 216 retrieves 512 verbose context data 514 from the network message 502.

The context data updater 216 updates 508 the context database 507 with the verbose context data 514 using the limited context data 506 as an index. If some other verbose context data is already indexed by the limited context data 506 in the context database 507, the context data updater 216 may append or overwrite the other verbose context data with the verbose context data 514.

The context data updater 216 optionally removes 516 the verbose context data from the network message 502 to produce a translated network message 518. In some embodiments it is not necessary to remove 516 the verbose context data, while in other embodiments this procedure is desirable. If this optional step is not implemented, the translated network message 518 is equivalent to the network message 502.

The translated network message 518 is ready to be sent to the user computer 102, as illustrated in FIG. 3. The translated network message 518 is of a form such that the request contained therein may be interpreted by the user computer 102 as a standard message, and the context database 507 has been updated to reflect changes or additions of verbose context data.

Figure 5B:
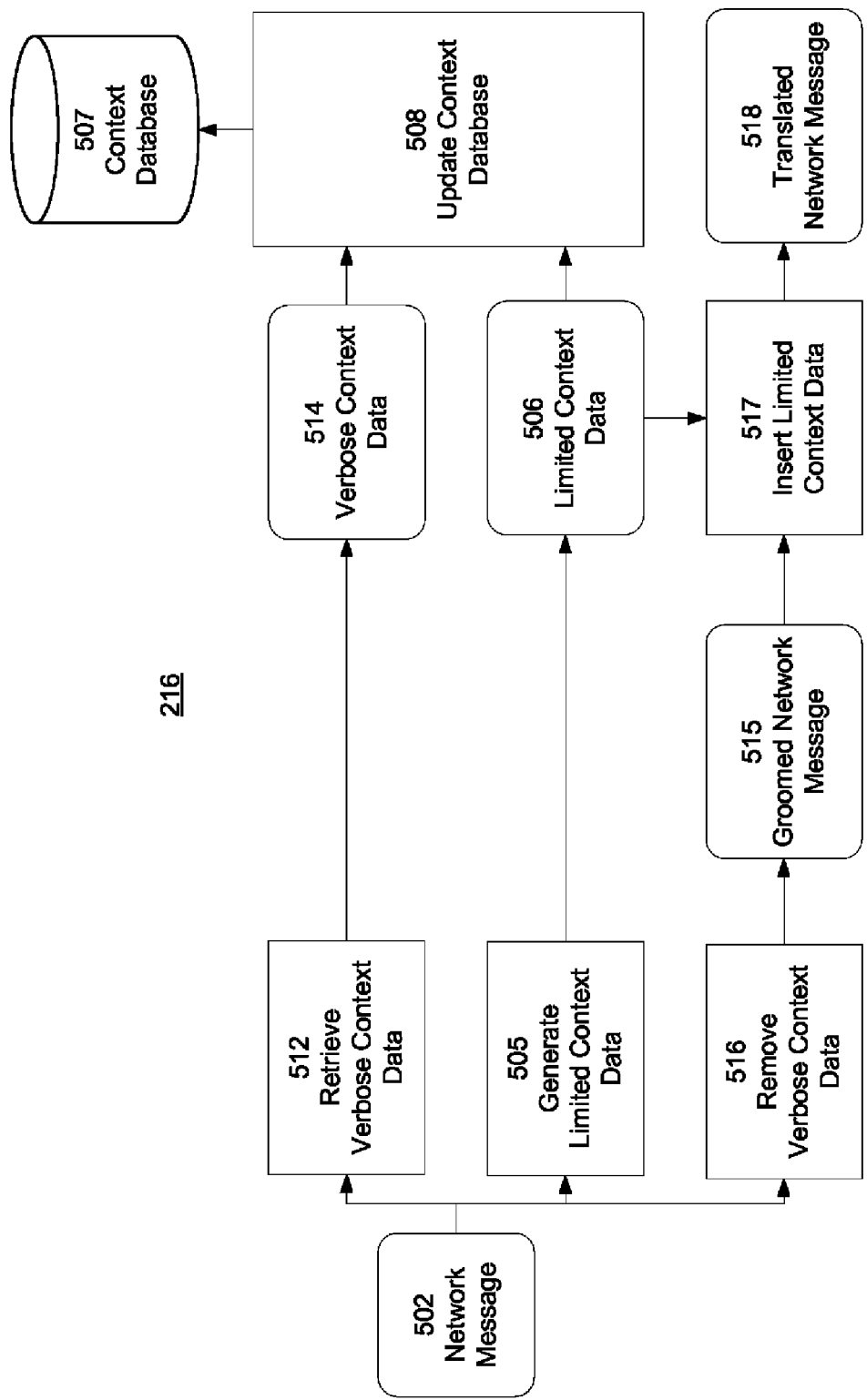
FIG. 5b is a flow diagram illustrating a method for storing context data in a context data server, according to another embodiment of the present invention.

FIG. 5b illustrates a method for storing context data in a context data server, according to another embodiment of the present invention. In one embodiment, the method is performed by the context data updater 216. A network message 502 has been received by the context data server 106. In this example, the network message 502 comprises some verbose context data 514.

According to another embodiment of the present invention, the context data updater 216 generates 505 limited context data 506. According to one embodiment of the present invention, the limited context data 506 may be analogous to the index data described herein with reference to FIG. 3. The limited context data 506 may be any data with which it is possible to associate verbose context data in the context database.

According to one embodiment of the present invention, the context data updater retrieves 512 verbose context data 514, and updates 508 the context database 507 as described herein with reference to FIG. 5a.

The context data updater 216 optionally removes 516 the verbose context data from the network message 502 to produce a groomed network message 515. If this optional step is not implemented, the groomed network message 515 is equivalent to the network message 502.

The context data updater 216 inserts 517 the limited context data 506 into the groomed network message 515 to produce a translated network message 518. The limited context data 506 may be inserted 517 into the network message 502 in any number of manners. For example the limited context data 406 may be stored in a cookie field, a hidden form field, in the header of the translated network message 518, or somewhere else in the translated network message 518.

The translated network message 518 is ready to be sent to the user computer 102, as illustrated in FIG. 3. The translated network message 518 is of a form such that the request contained therein may be interpreted by the user computer 102 as a standard message, and the context database 507 has been updated to reflect changes or additions of verbose context data.

FIG. 6 is a flow diagram illustrating a method for responding to a page request containing context data, according to one embodiment of the present invention. In one embodiment, the method is performed by the web server 110. While FIG. 6 illustrates an example of handling an HTTP request containing context data in a web server, it teaches a method for handling any type of data request in any type of data server. The example of HTTP has been chosen for the purpose of illustration, but does not limit the scope of the invention.

A network message 602 has been received by the web server 110 as illustrated in FIG. 3. The network message 602 corresponds to the translated network message 418 prepared by the method illustrated in FIG. 4. As such, the network message 602 contains verbose context data 606. The web server 110 retrieves 604 the verbose context data 604 from the network message 602.

The web server 110 optionally removes 610 the verbose context data to produce a network message equivalent to the network message 402, i.e. equivalent to the network message as originally received by the method for context data retrieval as illustrated in FIG. 4. In the example shown in FIG. 6, this network message is a standard HTTP request 612. If the verbose context data 610 is stored in the network message 602 in such a way as to not interfere with the normal processing of an HTTP request, the network message 602 is already in the form of a standard HTTP request 612, and it may not be desired to remove 610 the verbose context data.

The web server 110 passes the verbose context data 606 and the standard HTTP request 612 to a web service application 608. The web service application 608 handles the standard HTTP request 606 using any of the well known methods in the art, referring to the verbose context data 606 as necessary. The web service application 608 returns a standard HTTP response 614 and, in some instances, updated verbose context data 616. If the updated verbose context data 616 is present, the web server 110 inserts 618 the updated verbose context data 616 into the standard HTTP response 614.

The web server 110 optionally inserts 620 limited context data into the resulting message as necessary to produce a responsive network message 622. Examples of methods in which limited context data may be stored in a network message are given herein with reference to FIGS. 4-5. According to one embodiment of the present invention, limited context data is inserted by the web server 110. According to another embodiment of the present invention, limited context data is inserted by the context data updater 216.

The responsive network message 622 is ready to be transmitted to the context data server 106 as illustrated in FIG. 3. The responsive network message 622 is of the form so that it may be processed by the context data server 106 as illustrated in FIG. 5.

According to one embodiment of the present invention, multiple copies of the context database are maintained for the purposes of backing up context data in the event of failure of the context data server. Any of the well-known methods for providing redundant data services are applicable to the invention in the interest of failure prevention or response.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

While the invention has been particularly shown and described with reference to a preferred embodiment and several alternate embodiments, it will be understood by persons skilled in the relevant art that various changes in form and details can be made therein without departing from the spirit and scope of the invention.

What is claimed is:

1. In an enhanced hardware network device, a method for storing and retrieving context data for a network message comprising:
    receiving a first HyperText Transfer Protocol (HTTP) message from a first network device;
    identifying context data in the first HTTP message;
    removing the context data from the first HTTP message to produce a groomed HTTP message;
    storing the removed context data in a computer readable storage medium;
    transmitting the groomed HTTP message, comprising at least one element present in the first network message, to a second network device;
    receiving a third HTTP message from the second network device, the third HTTP message comprising index data identifying the stored context data;
    retrieving, from the computer readable storage medium, the stored context data identified by the index data;
    inserting the context data into the third HTTP message to produce a supplemented HTTP message; and
    transmitting the supplemented HTTP message to a network device.

2. The method of claim 1, wherein the context data is retrievable using the index data.

3. The method of claim 2, further comprising the step of:
    prior to transmitting the groomed HTTP message, inserting the index data into the groomed HTTP message.

4. The method of claim 3, wherein inserting the index data into the groomed HTTP message comprises inserting the index data into a hidden form field in the groomed HTTP message.

5. The method of claim 3, wherein inserting the index data into the groomed HTTP message comprises inserting the index data into an HTTP cookie in the groomed HTTP message.

6. The method of claim 1, wherein the first HTTP message is received via HyperText Transfer Protocol Secure (HTTPS) protocol.

7. The method of claim 1, wherein the enhanced network device comprises a TCP/IP router.

8. The method of claim 1, wherein the computer readable storage medium comprises a random access memory.

9. The method of claim 1, wherein the computer readable storage medium comprises a disk.

10. The method of claim 1, wherein the computer readable storage medium comprises a magnetic storage medium.

11. The method of claim 1, wherein the computer readable storage medium comprises an optical storage medium.

12. The method of claim 1, wherein the first HTTP message comprises a User Datagram Protocol (UDP) message.

13. The method of claim 1, wherein the first HTTP message comprises a Transmission Control Protocol (TCP) message.

14. The method of claim 1, wherein the first network device comprises a first server, the second network device comprises a client machine, and transmitting the supplemented HTTP message to a network device comprises transmitting the supplemented HTTP message to a second server.

15. The method of claim 1, wherein the first network device comprises a first server, the second network device comprises a client machine, and transmitting the supplemented HTTP message to a network device comprises transmitting the supplemented HTTP message to the first server.

16. The method of claim 1, wherein transmitting the supplemented HTTP message to a network device comprises transmitting the supplemented HTTP message to the first network device.

17. In an enhanced hardware network device, a method for translating context data from verbose context data to limited context data comprising the steps of:
    receiving a HyperText Transfer Protocol (HTTP) message comprising verbose context data from a first network device;
    removing the verbose context data from the HTTP message;
    storing the removed verbose context data to a computer readable storage medium in a manner that is indexed by limited context data;
    inserting the limited context data into the HTTP message to produce a translated HTTP message; and
    transmitting the translated HTTP message to a second network device;
    receiving a third HTTP message from the second network device, the third HTTP message comprising index data identifying the stored verbose context data;
    retrieving, from the computer readable storage medium, the stored verbose context data identified by the index data;
    inserting the verbose context data into the third HTTP message to produce a supplemented HTTP message; and
    transmitting the supplemented HTTP message to a network device.

18. The method of claim 17, wherein the limited context data comprises an HTTP cookie.

19. The method of claim 17, wherein the verbose context data comprises context data generated by an HTTP server.

20. The method of claim 17, wherein the verbose context data is found in the HTTP message in the form of a block comment.

21. The method of claim 17, wherein the HTTP message contains a header section and the verbose context data is found in the header section of the HTTP message.

22. The method of claim 17, wherein the limited context data comprises a hidden form field.

23. The method of claim 17, wherein the HTTP message is received via HyperText Transfer Protocol Secure (HTTPS).

24. The method of claim 17, wherein the computer readable storage medium comprises a random access memory.

25. The method of claim 17, wherein the computer readable storage medium comprises a disk.

26. The method of claim 17, wherein the computer readable storage medium comprises a magnetic storage medium.

27. The method of claim 17, wherein the computer readable storage medium comprises an optical storage medium.

28. The method of claim 17, wherein the HTTP message comprises a User Datagram Protocol (UDP) message.

29. The method of claim 17, wherein the HTTP message comprises a Transmission Control Protocol (TCP) message.

* * * * *